Nov. 27, 1928.
J. W. VEDDER
1,693,358
STONE ROLL
Filed Jan. 9, 1928
2 Sheets-Sheet 1
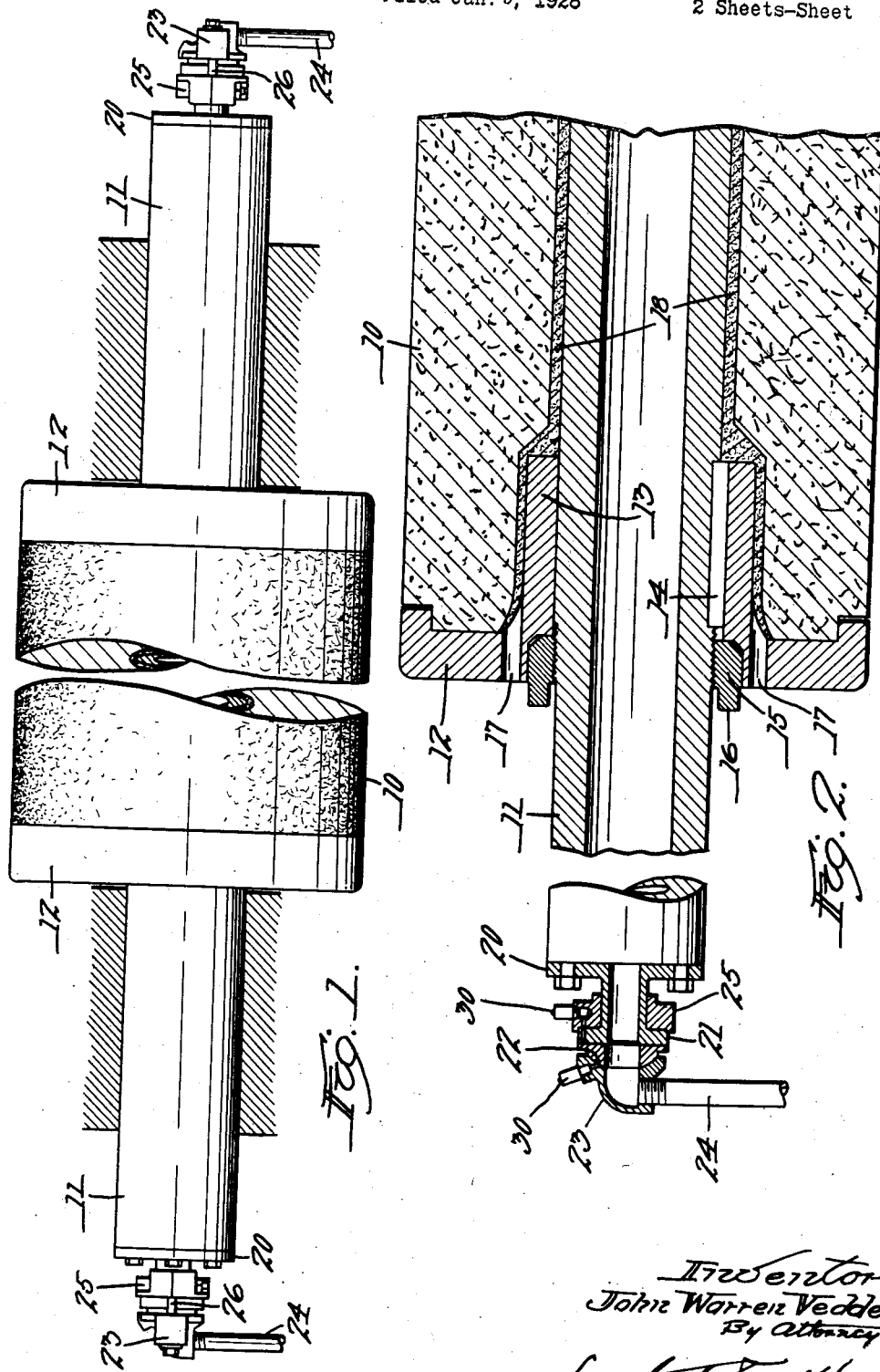

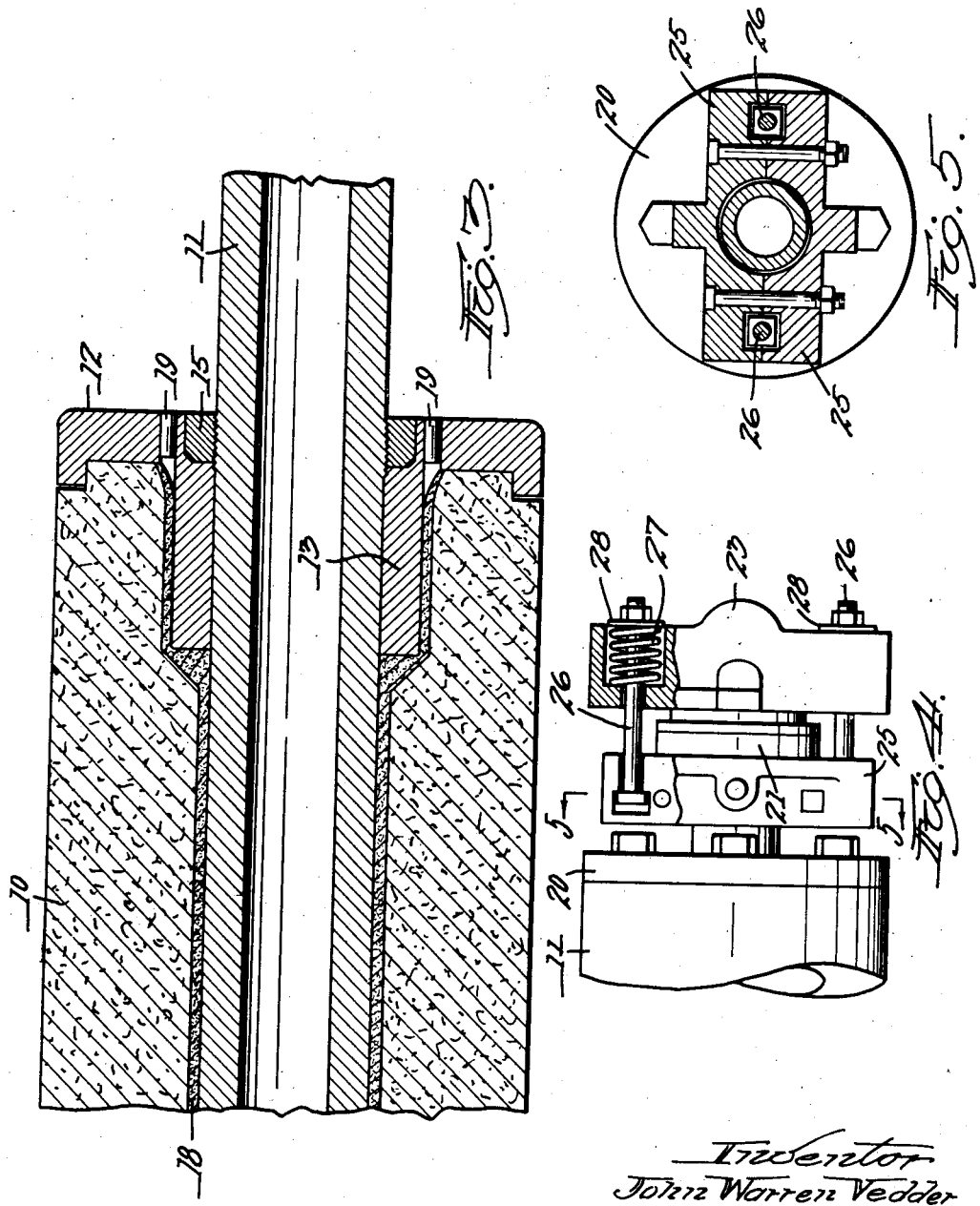

Patented Nov. 27, 1928.

1,693,358

UNITED STATES PATENT OFFICE.

JOHN WARREN VEDDER, OF WORCESTER, MASSACHUSETTS.

STONE ROLL.

Application filed January 9, 1928. Serial No. 245,328

This invention relates to a stone roll for use in the paper making industry or in other industries and the principal objects of the invention are to provide means for keeping the interior of the roll cool by circulating water through it; to provide improvements in the construction of the said means and also to provide improvements in the way of sealing the end of the roll and in the water connections.

Other objects and advantages of the invention will appear hereinafter.

Reference is to be had to the accompanying drawings in which

Fig. 1 is a side view of a stone roll and connected parts constructed in accordance with this invention;

Fig. 2 is a diametrical sectional view of one end of the same with the sealing only partially completed;

Fig. 3 is a corresponding view of the other end with the sealing completed;

Fig. 4 is an enlarged plan of the water circulating connections at the end of the hollow shaft, and Fig. 5 is a sectional view on the line 5—5 of Fig. 4.

This invention is shown as applied to a stone roll 10 used chiefly in the paper making industry. In order to properly cool the roll I take advantage of the fact that a shaft has to be passed through it and provide a shaft 11 for this purpose which is hollow and in the form of a pipe. This shaft is not made to fit the interior of the roll but there is a space all around it.

The roll is provided with a metal cap 12 at each end fitting against the reduced edge around the roll. This cap is provided with a hub 13 which is finished on the inside and fits accurately the finished surface of the pipe or shaft 11. It is keyed to it at 14. The pipe is provided with screw threads on which is screwed a cast nut 15 having integral lugs 16 thereon for use in inserting it in position. This nut fits into a recess in the hub 13 and is used, one at each end, for securely clamping the two caps 12 to the end of the stone roll 10.

Through the cap are passages 17 which extend down into the space which surrounds the hub 13 and sulphur or sulphur compound is poured through these perforations and forms a sulphur seal 18 which extends all around the hub 13 and also all around the shaft 11 from end to end of the roll 10. This forms a continuous body of sulphur sealing the roll from the admission of air or water and protecting the shaft and roll from these elements.

After the nut 15 is screwed down in place, the lugs 16 are knocked off, preferably, so as not to be in the way and to leave a permanent seal. Pins 19 are driven into the holes 17.

The ends of the pipe 11 of course extend beyond the roll and serve as bearings for it. At each end is a cap 20 which is bolted to the pipe and is provided with a central passage communicating with its interior. This cap has an extension or neck provided with a head 21 against which fits the convex part 22 of a spherical joint. The other part 23 of this joint performs the function of a pipe elbow and receives cooling water through a pipe 24 which is connected with it. The parts 22 and 23 are hollow for this purpose. This joint permits of a slight variation in the angular position of the parts.

The water is introduced into one of the pipes 24 and discharged through the other and the parts are the same at both ends. The head or flange 21 fits against a casting 25 mounted on the neck of the cap 20. This casting is formed in two parts bolted together and having at the joint, T-slots into which the heads of a set of bolts 26 project. These bolts are each provided with a spring 27 at the other end, pressing against a washer 28 and are located in recesses in the head 23 at the extreme end of the device. This spring connection is employed for the purpose of permitting the spherical joint to swing slightly as stated above and to constantly press the parts together. The surfaces on both sides of the member 22 are adapted to be lubricated through oil cups 30 in a well known way.

By this construction the interior of the stone roll is capable of being water cooled by passing a current of water through it and the life of the roll thus materially increased without danger of any material leakage of the water and the mechanism is of a simple character and convenient to set up and manipulate. The ends of the roll are protected by the sulphur as stated above.

Although I have illustrated and described only one form of the invention I am aware of the fact that modifications can be made therein by any person skilled in the art without departing from the scope of the invention as expressed in the claims.

Therefore, I do not wish to be limited in these respects, but what I do claim is:—

1. The combination with a stone roll for a paper making machine, of a hollow shaft passing through the roll on which it is supported and connections at the ends of the shaft for circulating cooling water through the center of the shaft from one end to the other.

2. The combination with a stone roll for a paper making machine, of a hollow shaft passing through the roll, connections for circulating cooling water through the shaft, a cap covering the end of the roll fitted to the shaft, and keyed thereto, but spaced from the roll inside, and a nut located in the cap and screwed on the shaft to hold the cap against the end of the roll.

3. The combination with a roll for a paper making machine, of a hollow shaft passing through the roll, connections for circulating cooling water through the shaft, a cap covering the end of the roll fitted to the shaft, and keyed thereto, but spaced from the roll, the cap having a perforation therethrough communicating with said space, and a sulphur seal introduced through said perforation and filling all spaces between the roll and the cap and shaft.

4. The combination with a roll for a paper making machine, of a hollow shaft passing through the roll, a spherical joint, a cap secured to the end of the shaft and having a head on its outer end, a two-part member back of the head having sockets, bolts having their heads in said sockets and connected with the outer member of the spherical joint, and springs on said bolts to hold the joint in place with a strong yielding pressure, the cap and joint being hollow to conduct water to or from the interior of the shaft.

In testimony whereof I have hereunto affixed my signature.

JOHN WARREN VEDDER.